2,926,096
Patented Feb. 23, 1960

2,926,096

IMPREGNATING COMPOSITION

Songe S. Sakornbut, Kirkwood, Mo., assignor to Monsanto Chemical Company, St. Louis, Mo., a corporation of Delaware No Drawing. Application April 27, 1955
Serial No. 504,339

14 Claims. (Cl. 106—15)

This invention relates to a formulation of chlorinated phenols suitable for the simple preparation of impregnants for cellulosic materials. More specifically, the invention relates to a concentrate of pentachlorophenol which can be diluted with volatile petroleum oils without precipitating the active ingredients to form a solution for making superior impregnated products.

It is well known that pentachlorophenol, and other chlorinated phenols, are useful toxicants for controlling objectionable fungi, insects and undesirable plant life, and is widely used in compositions for impregnating wood, paper and other cellulosic materials. In general, the solubility characteristics of pentachlorophenol, and other chlorinated phenols, are such that generally only small concentrations of the chlorinated phenols can be retained in conventional solvents. It has long been recognized that concentrated solutions of the chlorinated phenols can be prepared by the proper selection of a solvent; however, when the concentrates are diluted with available petroleum solvents and when the resulting solutions are used for preservative treatment, the chlorinated phenols are not deposited in stable form. The impregnating toxicant soon crystallizes out due to evaporation of the solvents, a phenomenon known as "blooming." Furthermore, compositions of the prior art are not fire and flame resistant; in many cases the combustibility of the impregnated cellulosic composition is increased.

Concentrates known to the prior art when accidentally contaminated with water, either by rainfall or by absorption when contacted with moist atmospheres, frequently cannot be diluted with thinning solvents without the formation of cloudy solutions due to the precipitation of the pentachlorophenol. The use of the cloudy solutions does not produce satisfactory impregnated articles.

In the use of many of the prior art impregnating solutions initial penetration of the cellulosic products by the pentachlorophenol may be achieved. However, upon standing the volatile solvent evaporates leaving crystals of pentachlorophenol, which then become subject to loss by volatilization and leaching. This "blooming" reduces the effectiveness of the treatment.

The principal purpose of this invention is to provide a composition for impregnating wood, paper and other cellulosic products. A further purpose of the invention is to provide methods of flameproofing cellulosic products and rendering them resistant to destructive activity of fungi and insects. A still further purpose is to provide a chlorinated phenol composition useful in impregnating cellulosic materials which is free of blooming tendencies. Other purposes involve the imparting of flameproofness to normally combustible cellulosic products. The following specification will make evident further objects of the invention.

In accordance with this invention it has been found that formulations of chlorinated phenols, and particularly pentachlorophenol, can be made in a concentrated form which is capable of being diluted with volatile solvents to form useful impregnating compositions, if all or a substantial portion of the solvent is an ester of phosphoric acid.

The esters of phosphoric acid may be aliphatic or aromatic, including tributyl phosphate, triamyl phosphate, triphenyl phosphate, tricresyl phosphate, trioctyl phosphate, and other near homologues of the tri esters of phosphoric acid. Other compositions which may be used in the practice of this invention are the mixed esters involving two or three different aliphatic radicals, two or three different aromatic radicals or they may be mixed aromatic aliphatic phosphates containing one or more of each aromatic and aliphatic radicals. Suitable mixed esters are:

Dibutyl phenyl phosphate
Butyl diphenyl phosphate
Amyl diphenyl phosphate
Diamyl phenyl phosphate
Diamyl cresyl phosphate
Dibutyl cresyl phosphate
Cresyl diphenyl phosphate
Phenyl dicresyl phosphate
Butyl dicresyl phosphate
Octyl diphenyl phosphate
Dioctyl cresyl phosphate
Dioctyl phenyl phosphate and other esters containing three organic radicals selected from the group consisting of aliphatic radicals having four to eight carbon atoms, the aromatic radicals such as phenyl, and substituted phenyl which may contain one or more alkyl substituents, such as methyl, ethyl and propyl.

In the preparation of useful impregnating chlorinated phenol solutions in accordance with this invention there is a critical relationship between the chlorinated phenol and phosphate esters. In general, the impregnating solutions will have a relatively high concentration of the chlorinated phenols, for example from 3 to 65 percent by weight and ½ to 5 parts of the phosphate ester for each part of the chlorinated phenol. An important modification of the invention is the concentrate which may be diluted with conventional petroleum solvents to form an effective impregnating solution, which may consist of only the chlorinated phenol and the phosphate ester.

The optimum proportions of chlorinated phenol and phosphoric acid esters will vary with the esterifying group in the phosphoric acid ester. The lower aliphatic phosphates, such as tributyl phosphate, will tolerate a larger proportion of the chlorinated phenol, whereas with the aromatic esters and particularly those containing alkyl substituted aromatic groups, more of the phosphoric acid ester will be required in the preparation of a concentrate of optimum properties. The preferred minimum ratio of ester to chlorinated phenol may be determined by the following empirical formula: $n/20$ wherein $n$ is the total number of carbons in the phosphoric acid ester. The maximum ratio of ester to chlorinated phenol for obtaining optimum performance may be represented by the following empirical formula: $n/10$ wherein $n$ is the number of carbon atoms in the phosphoric acid ester.

The new solutions are prepared merely by mixing the phosphoric acid esters with the pentachlorophenol with agitation until a homogeneous solution is obtained. Although in general the solutions will contain the said two critical components, other additives may be mixed thereto for developing specialized properties as required. For example, fluidity and the resultant ease of formulation may be improved if the solutions include a minor proportion of a mobile solvent such as benzene, acetone, diacetone alcohol, methyl ethyl ketone, petroleum ether, kerosene, xylene, or toluene. If the solutions are intended for use in the preparation of formulations having the ability to produce water repellent surfaces, a small proportion of paraffin or other wax may be added. By the incorporation of a highly chlorinated aromatic or aliphatic hydrocarbon the concentrate will be more useful in the preparation of wood treating solutions capable of developing flame resistant properties in the substance to be treated.

The concentrates, for example solutions of at least 10 percent of the chlorinated phenols incorporating the above defined proportions and the specific ratios, are readily diluted to develop the physical characteristics. Desired fluidity may be obtained by incorporating suitable compatible thinners, such as benzene, toluene, xylene, mineral spirits, petroleum ether, kerosene or higher molecular weight petroleum fractions depending upon the property required. Obviously, if fireproof or flame resistant properties are required in the treated cellulosic product, the diluents should be so selected that they may be readily evaporated from the product subsequent to treatment.

Further details of the preparation and use of the new concentrates are set forth with respect to the following examples.

Example 1

A pentachlorophenol concentrate for dilution with 10 volumes of mineral spirits to a fire retardant paintable and non-blooming 5% pentachlorophenol solution was prepared by dissolving 37.8 parts of pentachlorophenol, 41.4 parts of tributyl phosphate and 20.8 parts of an aromatic petroleum oil (AMSCO–SOLV HT). This concentrate, having a solution point of −11° C., was satisfactory with respect to resistance to cold weather. The concentrate was found to be capable of dilution with mineral spirits to form clear diluted solutions, which property was not lost by standing in moist atmospheres. Wood samples treated with the solution were dried for 24 hours to permit the evaporation of the mineral spirits. No evidence of blooming was observed, and the wood was found to be fire resistant and free from after-glow when heated in a bunsen flame. The treated wood was readily paintable.

The advantages of the use in accordance with this example are evident from a comparison with an impregnating solution which utilizes diacetone alcohol, well known for its high solvency for pentachlorophenol in place of the phosphate. The solution was susceptible to contamination by water and upon dilution with the petroleum oil a cloudy solution resulted. Wood treated with the solution will show serious blooming upon drying and is not fire retardant.

Example 2

The procedure described in the preceding experiment was repeated using 33.8% pentachlorophenol, 44.1% dibutyl phenyl phosphate and 22.1% of chlorinated biphenyl (sold under the trademark Aroclor 5460). The solution had a solution point of −6° C. and was an effective impregnant for wood treatment. Wood treated in this manner contained an effective proportion of pentachlorophenol which did not bloom or otherwise affect the surface, and is fire retardant.

Example 3

Another useful impregnating composition was made by mixing 17% of pentachlorophenol with 26% of cresyl diphenyl phosphate, 41.5% of a chlorinated biphenyl (sold under the trademark Aroclor 4465) and 15.5% of xylene. This solution, which had a solution point of −1° C., was found to be a useful wood impregnant concentrate to produce fire retardant, non-blooming and paintable products.

Example 4

A mixture of 35% of pentachlorophenol and 65% dibutyl phenyl phosphate, which concentrate had a solution point of −20° C., was capable of dilution with mineral spirits to form an effective wood treating composition which did not bloom and is fire retardant.

Example 5

Another effective wood preservative was made with about 38% pentachlorophenol, 41% of tributyl phosphate and 21% of aromatic petroleum oil. This concentrate was not susceptible to contamination by water and could be freely diluted to form a non-blooming and flame retardant product.

What is claimed is:

1. A solution of a chlorinated phenol which consists essentially of from 20 to 65 parts by weight of the chlorinated phenol and from 35 to 80 parts by weight of a phosphoric acid ester of the following structure

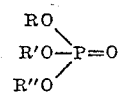

wherein each of the R, R′ and R″ groups is selected from the group consisting of alkyl radicals having at least four carbon atoms, aryl radicals and alkaryl radicals, provided that the total number of carbon atoms will be from twelve (12) to twenty-five (25).

2. The composition defined by claim 1 wherein the solution contains up to 50 parts by weight of a volatile solvent.

3. The composition defined by claim 1 wherein the phosphoric acid ester is tricresyl phosphate and the chlorinated phenol is pentachlorophenol.

4. The composition defined by claim 1 wherein the phosphoric acid ester is dibutyl phenyl phosphate and the chlorinated phenol is pentachlorophenol.

5. The composition defined by claim 1 wherein the phosphoric acid ester is tributyl phosphate and the chlorinated phenol is pentachlorophenol.

6. The composition defined by claim 1 wherein the phosphoric acid ester is triisoamyl phosphate and the chlorinated phenol is pentachlorophenol.

7. The composition defined by claim 1 wherein the phosphoric acid ester is cresyl diphenyl phosphate and the chlorinated phenol is pentachlorophenol.

8. A concentrated solution of a chlorinated phenol containing as its principal components at least 10 percent of the chlorinated phenol and from 50 percent by weight to 500 percent (based on the chlorinated phenol) of an ester of phosphoric acid of the following structure

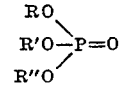

wherein each of the R, R′ and R″ groups is selected from the group consisting of alkyl radicals having at least four carbon atoms, aryl radicals and alkaryl radicals, provided that the total number of carbon atoms will be from twelve (12) to twenty-five (25).

9. The composition defined by claim 8 which contains up to 50 percent of a volatile solvent.

10. The composition defined by claim 8 wherein the phosphoric acid ester is tricresyl phosphate and the chlorinated phenol is pentachlorophenol.

11. The composition defined by claim 8 wherein the phosphoric acid ester is dibutyl phenyl phosphate and the chlorinated phenol is pentachlorophenol.

12. The composition defined by claim 8 wherein the phosphoric acid ester is tributyl phosphate and the chlorinated phenol is pentachlorophenol.

13. The composition defined by claim 8 wherein the phosphoric acid ester is triisoamyl phosphate and the chlorinated phenol is pentachlorophenol.

14. The composition defined by claim 8 wherein the phosphoric acid ester is cresyl diphenyl phosphate and the chlorinated phenol is pentachlorophenol.

References Cited in the file of this patent

UNITED STATES PATENTS

| | | |
|---|---|---|
| 2,117,283 | Bass | May 17, 1938 |
| 2,397,320 | Koch | Mar. 26, 1946 |
| 2,418,843 | Leatherman | Apr. 15, 1947 |
| 2,443,566 | Loveland | June 15, 1948 |

OTHER REFERENCES

Condensed Chemical Dictionary, pub. by Reinhold (1950) (p. 672 relied upon).